(12) United States Patent
Davis

(10) Patent No.: US 8,276,814 B1
(45) Date of Patent: Oct. 2, 2012

(54) SYSTEM AND METHOD FOR CARRYING OUT SECURE TRANSACTIONS

(76) Inventor: Kim C. Davis, Columbus, OH (US)

( * ) Notice: Subject to any disclaimer, the term of this patent is extended or adjusted under 35 U.S.C. 154(b) by 0 days.

(21) Appl. No.: 12/500,804

(22) Filed: Jul. 10, 2009

Related U.S. Application Data

(60) Provisional application No. 61/080,229, filed on Jul. 12, 2008.

(51) Int. Cl.
*G06K 5/00* (2006.01)
(52) U.S. Cl. ......... 235/380; 235/375; 235/379; 235/487
(58) Field of Classification Search .................. 235/375, 235/379, 380, 487, 492
See application file for complete search history.

(56) References Cited

U.S. PATENT DOCUMENTS

| | | | | |
|---|---|---|---|---|
| 4,328,414 | A | * | 5/1982 | Atalla ........................... 235/380 |
| 5,347,580 | A | * | 9/1994 | Molva et al. .................. 713/159 |
| 5,485,519 | A | * | 1/1996 | Weiss ............................ 713/185 |
| 5,566,327 | A | | 10/1996 | Sehr |
| 5,721,781 | A | * | 2/1998 | Deo et al. ........................ 705/67 |
| 5,884,292 | A | * | 3/1999 | Baker et al. .................... 705/403 |
| 6,058,481 | A | * | 5/2000 | Kowalski ........................... 726/9 |
| 6,105,008 | A | * | 8/2000 | Davis et al. ...................... 705/41 |
| 6,308,887 | B1 | * | 10/2001 | Korman et al. ................ 235/379 |
| 6,473,500 | B1 | * | 10/2002 | Risafi et al. .............. 379/144.01 |
| 6,601,759 | B2 | | 8/2003 | Fife et al. |
| 6,601,771 | B2 | * | 8/2003 | Charrin ......................... 235/492 |
| 6,684,269 | B2 | | 1/2004 | Wagner |
| 6,694,387 | B2 | | 2/2004 | Wagner |
| 6,745,936 | B1 | * | 6/2004 | Movalli et al. ................ 235/379 |
| 6,796,497 | B2 | * | 9/2004 | Benkert et al. ................ 235/380 |
| 6,805,287 | B2 | | 10/2004 | Bishop et al. |
| 6,847,816 | B1 | | 1/2005 | Sarradin |
| 6,880,084 | B1 | | 4/2005 | Brittenham et al. |
| 6,913,193 | B1 | * | 7/2005 | Kawan ........................... 235/380 |
| 6,955,299 | B1 | * | 10/2005 | Pathmasuntharan et al. . 235/492 |
| 6,988,658 | B2 | | 1/2006 | Smith |
| 6,991,157 | B2 | | 1/2006 | Bishop et al. |
| 6,999,936 | B2 | | 2/2006 | Sehr |
| 7,003,797 | B2 | | 2/2006 | Bender et al. |
| 7,032,047 | B2 | | 4/2006 | DiRaimondo et al. |
| 7,036,738 | B1 | * | 5/2006 | Vanzini et al. ................. 235/486 |
| 7,039,952 | B2 | | 5/2006 | Bender et al. |
| 7,053,769 | B2 | * | 5/2006 | Vassallo ...................... 340/539.1 |
| 7,076,062 | B1 | * | 7/2006 | Spies ............................... 380/44 |
| 7,216,105 | B2 | * | 5/2007 | Adamson ......................... 705/41 |
| 7,328,191 | B2 | * | 2/2008 | McGee et al. ................... 705/67 |

(Continued)

*Primary Examiner* — Michael G Lee
*Assistant Examiner* — Paultep Savusdiphol
(74) *Attorney, Agent, or Firm* — Michael A. Forhan; James R. Eley; Eley Law Firm Co., LPA

(57) ABSTRACT

A multi-function stored-value debit card system includes smart cards carried by a user, as well as associated hardware, software, and communications networks configured to allow a user of the system to carry out secure transactions. Smart cards are distributed to patrons by a business desiring the patrons to use them to carry out commercial transactions while visiting points of sale of the business. Patrons use the cards as stored-value debit cards and for other optional applications unique to the business. Monetary values are physically carried on the card. A card reader capable of sensing multiple identifiers is associated with the smart cards. At least one of the identifiers is visually perceivable, while at least one identifier is not visually perceivable. A processor is included for treating the sensed identifiers according to a predetermined algorithm to derive a unique code for use in generating a secure transaction.

19 Claims, 19 Drawing Sheets

U.S. PATENT DOCUMENTS

| | | | |
|---|---|---|---|
| 7,580,899 B2 * | 8/2009 | Adamson | 705/77 |
| 7,594,611 B1 * | 9/2009 | Arrington, III | 235/487 |
| 7,917,432 B2 * | 3/2011 | Courtion et al. | 705/39 |
| 2002/0040936 A1 | 4/2002 | Wentker et al. | |
| 2002/0145051 A1 * | 10/2002 | Charrin | 235/492 |
| 2003/0065624 A1 * | 4/2003 | James et al. | 705/64 |
| 2003/0197058 A1 * | 10/2003 | Benkert et al. | 235/380 |
| 2004/0254892 A1 * | 12/2004 | Adamson | 705/73 |
| 2004/0256451 A1 | 12/2004 | Goman et al. | |
| 2005/0077350 A1 * | 4/2005 | Courtion et al. | 235/380 |
| 2005/0086168 A1 * | 4/2005 | Alvarez et al. | 705/41 |
| 2006/0155641 A1 * | 7/2006 | Postrel | 705/39 |
| 2006/0289636 A1 * | 12/2006 | Hoblit | 235/383 |
| 2007/0130087 A1 * | 6/2007 | Adamson | 705/77 |
| 2007/0158408 A1 * | 7/2007 | Wang et al. | 235/380 |
| 2007/0194104 A1 * | 8/2007 | Fukuda et al. | 235/379 |

* cited by examiner

FIGURE NOTES

NOTE 1 – SECRET INFORMATION:

A) LAST FOUR DIGITS SS# (EX. 7863)
   B) ZIP CODE (EX. 34772)
   C) ANSWER TO SECRET QUESTION (EX. JONES)
   D) PIN (EX. 2285)

NOTE 2 – DEPOSIT TRANSACTION RECORD CREATED:

A) DATE & TIME
   B) KIOSK ID #
   C) EMBEDDED CARD ID # 9876543210
   D) BAR CODE # 12345678910
   D) SECRET INFORMATION
   E) BEGINNING CARD BALANCE
   F) DEPOSIT AMOUNT
   G) ENDING CARD BALANCE
   H) TYPE TRANSACTION (CASH, DEBIT, CREDIT)
   I) CONFIRMATION NUMBER (IF DEBIT/CREDIT)

NOTE 3 – ADD-VALUE KIOSK INCLUDES:

A) TOUCH SCREEN DISPLAY
   B) CREDIT/DEBIT SWIPE READER
   C) BILL ACCEPTOR
   D) BAR CODE SCANNER
   E) CONTACTLESS SMART CARD READER
   F) RFID LINK

NOTE 4 – DEPOSIT TRANSACTION RECORD CREATED:

A) DATE & TIME
   B) KIOSK ID #
   C) EMBEDDED CARD ID # 9876543210
   D) BAR CODE # 12345678910
   E) BEGINNING CARD BALANCE
   F) DEPOSIT AMOUNT
   G) ENDING CARD BALANCE
   H) TYPE TRANSACTION (CASH, DEBIT, CREDIT)
   I) CONFIRMATION NUMBER (IF DEBIT/CREDIT)

NOTE 5 – DEPOSIT INFORMATION:

A) CARD BAR CODE #
   B) LAST 4 DIGITS SS # (EX. 7863)
   C) ZIP CODE (EX. 34772)
   D) ANSWER TO SECRET QUESTION (EX. JONES)
   E) PIN (EX. 2285)
   F) DEPOSIT AMOUNT
   G) BANK CARD TYPE (MC, VISA, ETC.)
   H) BANK CARD #
   I) BANK CARD EXPIR. DATE
   J) BANK CARD SECURITY CODE

NOTE 6 – DEPOSIT INFORMATION:

A) CARD BAR CODE #
   B) PIN (EX. 2285)
   C) DEPOSIT AMOUNT
   D) BANK CARD TYPE (MC, VISA, ETC.)
   E) BANK CARD #
   F) BANK CARD EXPIR. DATE
   G) BANK CARD SECURITY CODE

NOTE 7 – PAYMENT TRANSACTION RECORD:

A) DATE & TIME
   B) TERMINAL ID
   C) EMBEDDED CARD ID # 9876543210
   D) BEGINNING CARD BALANCE
   E) TRANSACTION AMOUNT
   F) ENDING CARD BALANCE

NOTE 8 – DEPOSIT TRANSACTION RECORD CREATED:

A) DATE & TIME
   B) KIOSK ID #
   C) EMBEDDED CARD ID # 9876543210
   D) BAR CODE # 12345678910
   E) BEGINNING CARD BALANCE
   F) DEPOSIT AMOUNT
   G) ENDING CARD BALANCE
   H) TYPE TRANSACTION (DEBIT OR CREDIT)
   I) CONFIRMATION NUMBER

*Fig. 15*

SYSTEM AND METHOD FOR CARRYING OUT SECURE TRANSACTIONS

This application claims priority to U.S. provisional application 61/080,229, filed Jul. 12, 2009, the contents of which are hereby incorporated by reference.

FIELD

The present invention relates generally to a system and method for carrying out secure transactions, and in particular to a smart card having multiple layers of security to deter theft and fraudulent use.

BACKGROUND

Typical debit cards utilize real-time online network systems which link a card user's debit card to a prepaid account, such as a checking account. Payment terminals are wired through a network connection to a server. All card user funds are on-account and stored in the server. When a transaction occurs, the payment terminal sends the card data (i.e., account number and personal identification number) to the server for validation. The server validates the account and checks the account balance for adequate funds to pay for the transaction. If funds are available, the transaction is approved. If funds are not available the transaction is denied. The total transaction time can range from 5 to 30 seconds. In these installations, all terminals are typically hard-wired to the network, requiring an extensive and complex network which must be expanded or modified with each new terminal addition or terminal relocation. Should the network fail, the payment terminals connected thereto are rendered inoperable. In addition, all data (including personal identity information) on the network is vulnerable to intrusion by unauthorized personnel. Furthermore, debit cards typically include data stored upon a magnetic stripe, which can be easily scanned by unauthorized personnel, allowing the account number to be copied and the card duplicated. Consequently, the card holder's account may be accessed by a thief and depleted before they are even aware of the breach.

One solution to the aforementioned problems is portable electronic devices capable of storing cash value electronically. The portable electronic device is used in place of hard currency (i.e., cash or coins) to perform financial transactions such as purchasing goods and services. A typical portable electronic device used for purchasing goods and services is a stand-alone card (commonly referred to as a "smart card") having embedded electronic circuitry to store and process electronic cash value information for performing financial transactions. Because hard currency is represented in electronic form and transactions are performed electronically, the smart card allows a user to carry less hard currency and reduce the need for exact change.

For example, to purchase goods or services at a business such as a gasoline station or supermarket a user may insert a contact-type of smart card into a card reader, whereupon the card reader makes contact with the smart card. After making contact with the card reader the smart card exchanges electronic cash value information with the card reader to perform the transaction. Alternatively, a user may place a contact-less type of smart card proximate a smart card reader, whereupon the smart card exchanges electronic cash value information with the smart card reader by means of radio frequency (RF) signals to perform the transaction. If the appropriate electronic cash value information is exchanged, the smart card reader and the smart card perform the transaction for the purchase of goods or services.

However, if a smart card lacking security features is lost, an unauthorized user may easily access the funds stored thereon. A typical security feature for a smart card is the use of a password or personal identification number ("PIN") in conjunction with a transaction. When conducting a transaction a user inputs a password or PIN that must be authenticated in order for the user to complete the transaction. One disadvantage of a password or PIN security feature is that the password or PIN may be easily copied or retrieved by an unauthorized user. Another disadvantage of using the password or PIN security feature is that, even if the correct password or PIN is provided in the course of a transaction, there is no assurance that it is the authorized user who is actually using the smart card.

A more sophisticated security feature for a smart card is the use of biometrics such as verbal verification, dynamic handwritten signature recognition, fingerprints, hand geometry and retinal scans to verify that an authorized user is using the smart card. Although such biometrics ensures that only an authorized user is using the smart card, such features require sophisticated hardware and extensive computing power, which increases a business' overhead cost to implement and maintain. From the consumer's perspective another disadvantage of using biometrics is that it increases the complexity of using the smart card to perform a transaction.

Another shortcoming associated with a smart card is recovering information stored in the smart card when it becomes lost, damaged, or destroyed. For example, the password or PIN security feature and the biometrics security features do not address the problem of recovering electronic cash value information stored in the smart card in the event that the smart card is lost, damaged, or destroyed. Without a way to recover electronic cash value information in a smart card a user thereof will be wary of relying upon the smart card to any significant extent. There is a need for a system that addresses the aforementioned drawbacks.

SUMMARY

A multi-function stored-value debit card system is disclosed according to an embodiment of the present invention. The system comprises one or more smart cards that can be carried by a user, as well as associated hardware, software, all of which are joinable by communications networks configured to allow a user of the system to carry out secure transactions. Smart cards are distributed (i.e., sold or given) to patrons by a business desiring the patrons to use them to carry out commercial transactions while visiting the points of sale of the business. The cards may be printed with the logo or other images representative of the business, if desired. Patrons use the cards as stored-value debit cards and for other optional applications unique to the business. Monetary values are physically carried on the card, unlike bank debit cards, where values are carried on account and stored at a remote server.

In operation, a patron pre-deposits monies directly with the business prior to visiting the business, using a credit/debit card balance transfer process through a network such as the internet. Funds are transferred from a credit or debit bank account held by the patron to an account maintained on the patron's behalf by the business (hereafter "deposit account"). Alternatively, the patron may effect transfer of the funds from a credit or debit bank account to a deposit account in-person while visiting the business. The patron may also present cash to the business for transfer to the patron's deposit account.

Upon arrival at the business the patron presents the card, whereupon the funds in the deposit account are transferred to the card.

Thereafter, the patron may utilize the smart card in the same manner as currency. For example, if the patron transfers $20 to a smart card and subsequently completes a transaction in the amount of $5.25 at a point of sale terminal of the business, the amount of the transaction is debited from the $20.00 beginning balance on the card and a $14.75 ending balance is written into the memory of the smart card. This is an electronic equivalent of the patron receiving $14.75 change in currency when presenting $20.00 in currency. As can be seen, the available funds are always physically in the possession of the patron.

In one embodiment of the present invention all point of sale terminals and deposit terminals are standalone devices, operable off-line, which record transactions with a real-time date/time stamp and store the transactions in an internal memory portion. The system is supported by a control comprising a back-end transaction reconciliation computer program residing on a network server, preferably of a wireless variety. By utilizing real-time offline devices in conjunction with stored-value technology, point of sale terminals and deposit terminals are more reliable than systems requiring constant network access, providing more utility to the card issuer. In addition, smart card balances are protected from potential hacking by unauthorized personnel. The standalone point of sale terminals and deposit terminals are periodically polled over the network by the control, which collects all transaction and deposit data and downloads a "hot list" of compromised cards (i.e., lost, stolen or damaged cards) to the standalone devices. Since all transactions are recorded and later collected, a transaction history is kept for each card in a database associated with the control. As a result, the ending balance of any compromised card can be determined, the card invalidated, and a replacement card reissued with the same ending balance. The point of sale terminals and deposit terminals may also prohibit further use of the invalidated card by "flagging" (i.e., rendering it useless) if a subsequent attempt is made to use it.

An embodiment of the present invention is a system for carrying out secure transactions. The system comprises a transaction card having a card memory portion, a non-visually perceivable card identification number, an encryption key associating the card to the system, a predetermined site code, and a visually perceivable card code. A deposit terminal is utilized to encode the transaction card with deposit data relating to a predetermined monetary value and to generate and store within the deposit terminal deposit transaction information relating to the monetary value. A control connectable to a network is provided, as well as a database accessible by the control. A point of sale terminal is connectable to the network for conducting commercial transactions, the point of sale terminal updating the card memory portion to reflect commercial transactions and storing information relating to the transaction card and commercial transactions in a terminal memory portion. The control is configured to generate an account number associated with the transaction card when connected to the point of sale terminal and database via the network. The control periodically polls the deposit terminal to obtain the deposit transaction information, the deposit transaction information being stored in the database. The control also periodically polls the point of sale terminal to obtain information relating to the commercial transactions, the commercial transaction information being stored in the database, and adjust the balance of the deposit transaction information stored in the database in the amount corresponding to the commercial transaction information.

BRIEF DESCRIPTION OF THE DRAWINGS

Further features of the present invention will become apparent to those skilled in the art to which the present invention relates from reading the following specification with reference to the accompanying drawings, in which:

FIGS. 6 through 15 describe various aspects of another embodiment of the present invention.

DETAILED DESCRIPTION

Figure 1A:
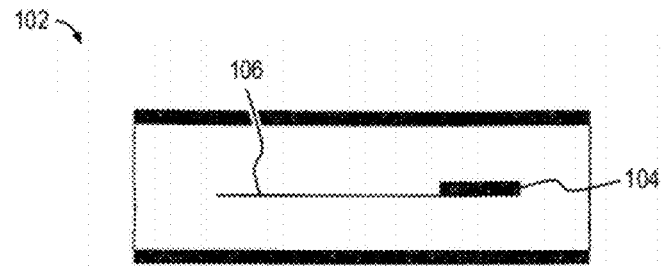
FIG. 1A is a view in section of a smart card according to an embodiment of the present invention.
Figure 1B:
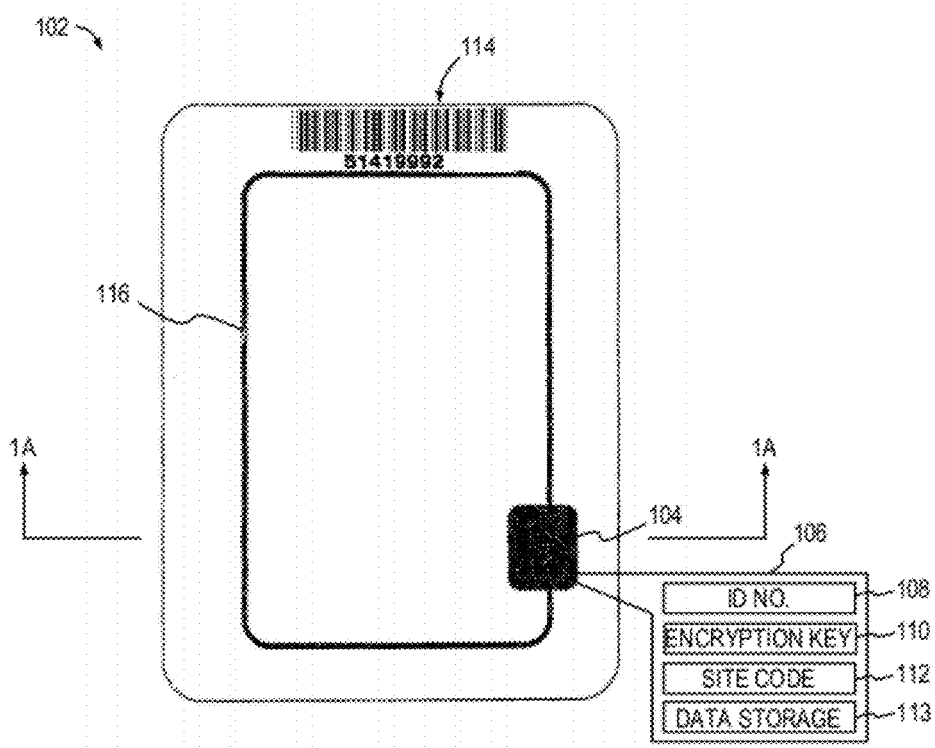
FIG. 1B is a top plan view of the smart card of FIG. 1A.
Figure 2:
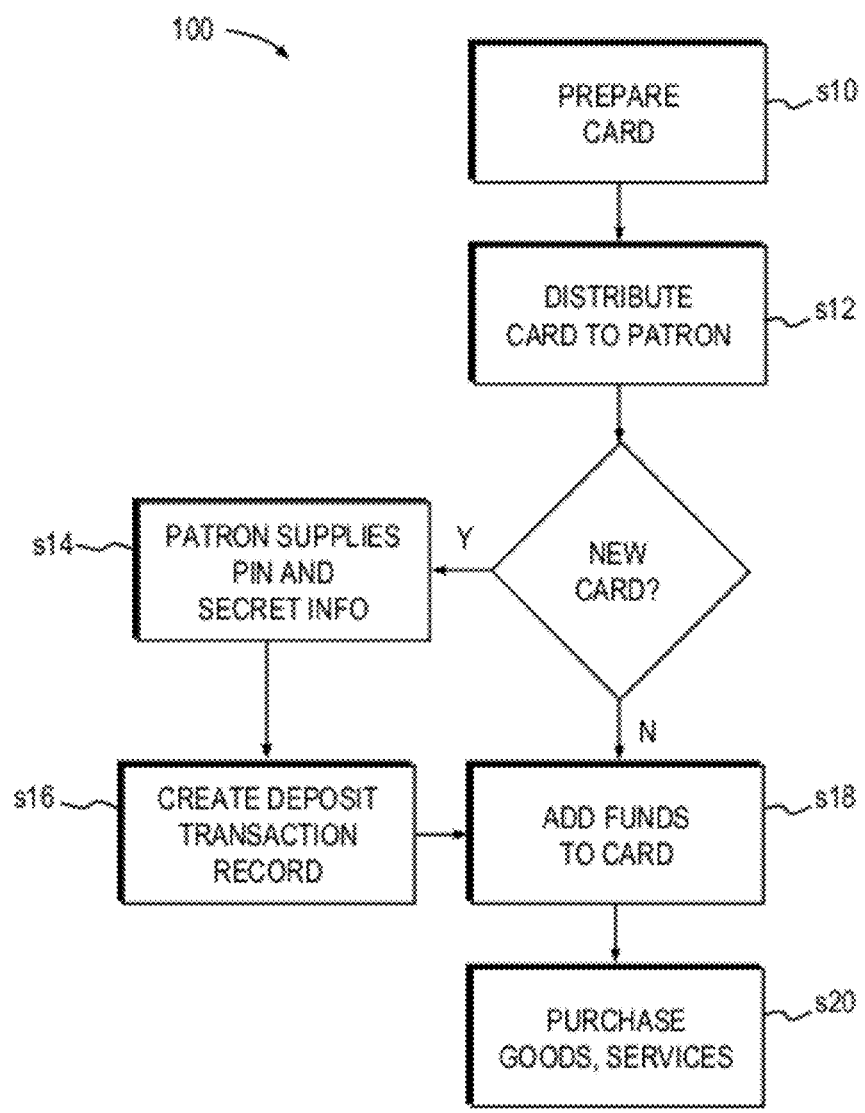
FIG. 2 is a flow diagram of a method for carrying out secure transactions according to an embodiment of the present invention.

The general arrangement of a system and method 100 for carrying out secure transactions is shown with reference to FIGS. 1A, 1B, 2 and 3 according to an embodiment of the present invention. At step s10 of method 100 transaction or "smart" card 102 is manufactured, printed and provided to a select business. A microprocessor chip 104 on each card 102 contains, stored in a memory portion 106, transaction criteria comprising a unique card identification (ID) number 108 assigned by the card manufacturer, an encryption key 110 associating the card to system and method 100, and a site code 112 unique to the business. Memory portion 106 also includes a data storage portion 113. In addition, the transaction criteria of card 102 includes a unique bar card code 114 or other visually perceivable card code with a corresponding human-readable number is printed on (or labeled to) the face of each card. It should be noted that ID number 108 and bar code 114 are not the same number. If card 102 is a contactless-type card, chip 104 may further include a filament 116 configured to function as an antenna, facilitating RF-based communications to and from the card.

At step s12 cards 102 are distributed to patrons of the sponsoring business, e.g., an amusement or theme park. Distribution may be accomplished in several ways. For example, a card 102 may be provided to a patron upon the patron's arrival at the business. Alternatively, card 102 may be provided to the patron at any point during the patron's visit, such as by means of an automated terminal or a customer service center. Card 102 may also be mailed to the patron.

Before using a select card 102 to purchase goods and services offered by the business the patron must first present to the business funds to be deposited to (i.e., "written to" or "encoded upon") the card. In an embodiment of the present invention any of one or more automated deposit terminals 118 may be employed for this purpose. If card 102 is new (i.e., funds have never been deposited thereon), the patron may be asked at step s14 to provide, using deposit terminal 118, additional transaction card criteria comprising user-specific secret information known only to the patron such as, for example, a select zip code, partial social security information, a personal identification number, and so on. The user-specific secret information is used to associate the patron with card 102. It should be noted that the secret information need not be personally identifiable patron information.

At step s16, the secret information of step s14, ID number 108, bar code number 114 of card 102, and the fund deposit amount are analyzed by deposit terminal 118 and a deposit transaction record associated therewith is generated and recorded in a memory portion of the deposit terminal. A control 120 may periodically poll deposit terminal 118, via a network 122, for the purpose of downloading deposit account information such as deposit transaction records and associated fund deposit amounts. Upon receipt of the deposit account information control 120, using a predetermined algorithm, generates a unique card account (number) for card 102. Control 120 may store the deposit account information and the associated card account (number) in a database 124.

At step s18 the patron may present card 102 to a deposit terminal 118 for the purpose of depositing funds onto the card. The patron also presents to deposit terminal 118 a PIN or other predetermined secret information of step s14. Deposit terminal 118 analyzes card ID number 108, bar code number 114 and the PIN and generates a deposit transaction record. The patron follows prompts displayed upon deposit terminal 118 to present funds (i.e., cash, debit card account information or credit card account information) to the deposit terminal. In response the deposit terminal 118 writes the deposit amount (and, optionally site code 112) to card 102, as well as record the deposit transaction record and the amount of the associated deposit in a memory portion of the deposit terminal. The patron may optionally be provided with a receipt evidencing the transaction. Control 120 may periodically poll deposit terminal 118, via network 122, for deposit account information associated with card 102. Upon receipt of deposit account information control 120 may store the information in database 124.

Once card 102 is encoded it may be used at step s20 to purchase goods and services at any of one or more point of sale terminals 126 located at the sponsoring business. The patron may utilize card 102 in the same manner as currency. For example, if the patron transfers $20 to card 102 and subsequently completes a transaction in the amount of $5.25 at a point of sale terminal 126, the amount of the transaction is debited from the $20.00 beginning balance on the card and a $14.75 ending balance is written into data storage 113 of memory 106 of the card. This is an electronic equivalent of the patron receiving $14.75 change in currency when presenting $20.00 in currency. As can be seen, the available funds are always physically in the possession of the patron.

Purchase information is periodically transferred from point of sale terminal 126 to control 120 when the point of sale terminal is polled by the control. To accomplish this, control 120 may periodically poll point of sale terminal 126, via network 122, for sales information associated with card 102. Upon receipt of sales information control 120 may store the information in database 124. Control 120 may further debit the deposit account in the amount of the sales information.

In some embodiments of the present invention a patron may transfer funds to a card 102 using an internet web site maintained by the business and a system via method 200, described below with reference to FIGS. 1A, 1B, 3 and 4. At step s30 a patron accesses the business' web site and selects a predetermined "deposit funds" icon.

If the patron does not already have a card 102 the patron may be asked at step s32 to provide, using the web site, secret information known only to the patron such as, for example, a select zip code, partial social security information, a personal identification number, and so on. The secret information is used to associate the patron with card 102. It should be noted that the secret information need not be personally identifiable patron information.

Figure 3:
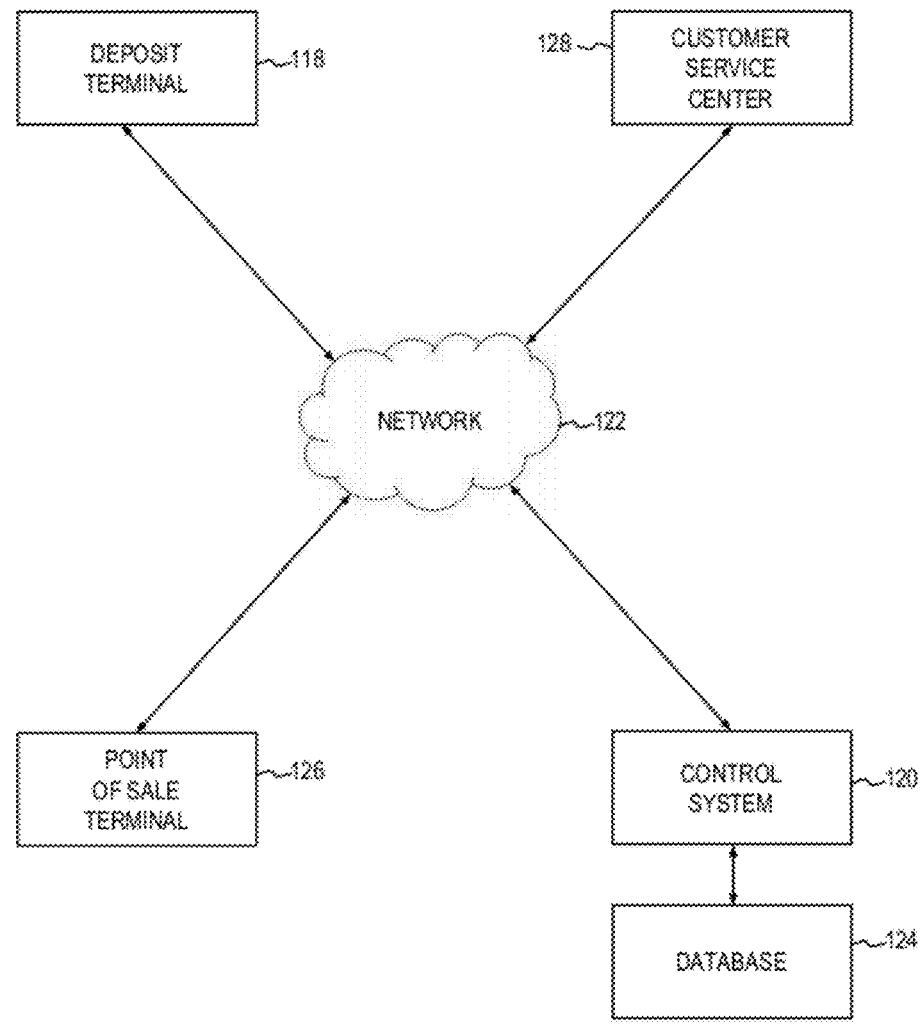
FIG. 3 is a block diagram of a system for carrying out secure transactions according to an embodiment of the present invention.
Figure 4:
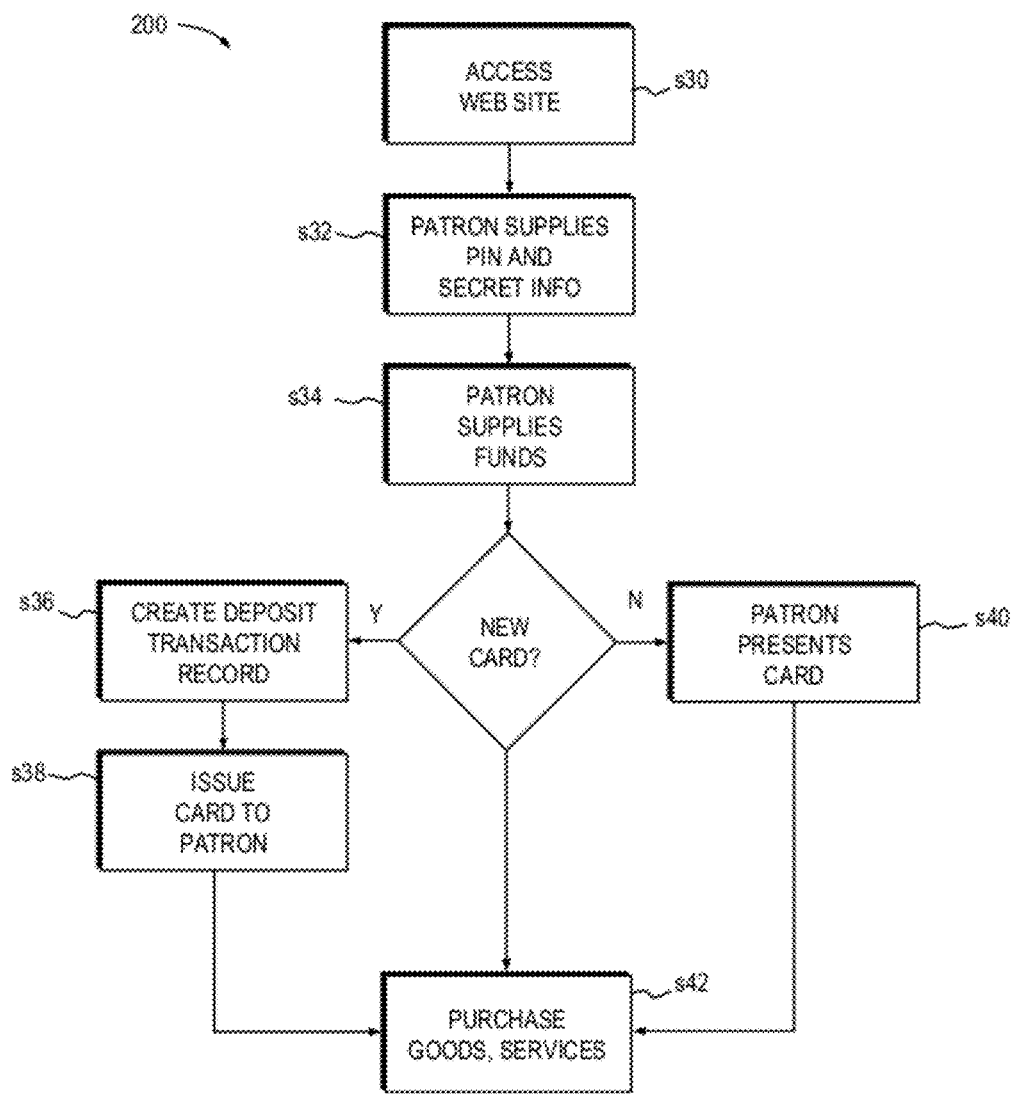
FIG. 4 is a flow diagram of a method for carrying out secure transactions according to another embodiment of the present invention.
Figure 5A:
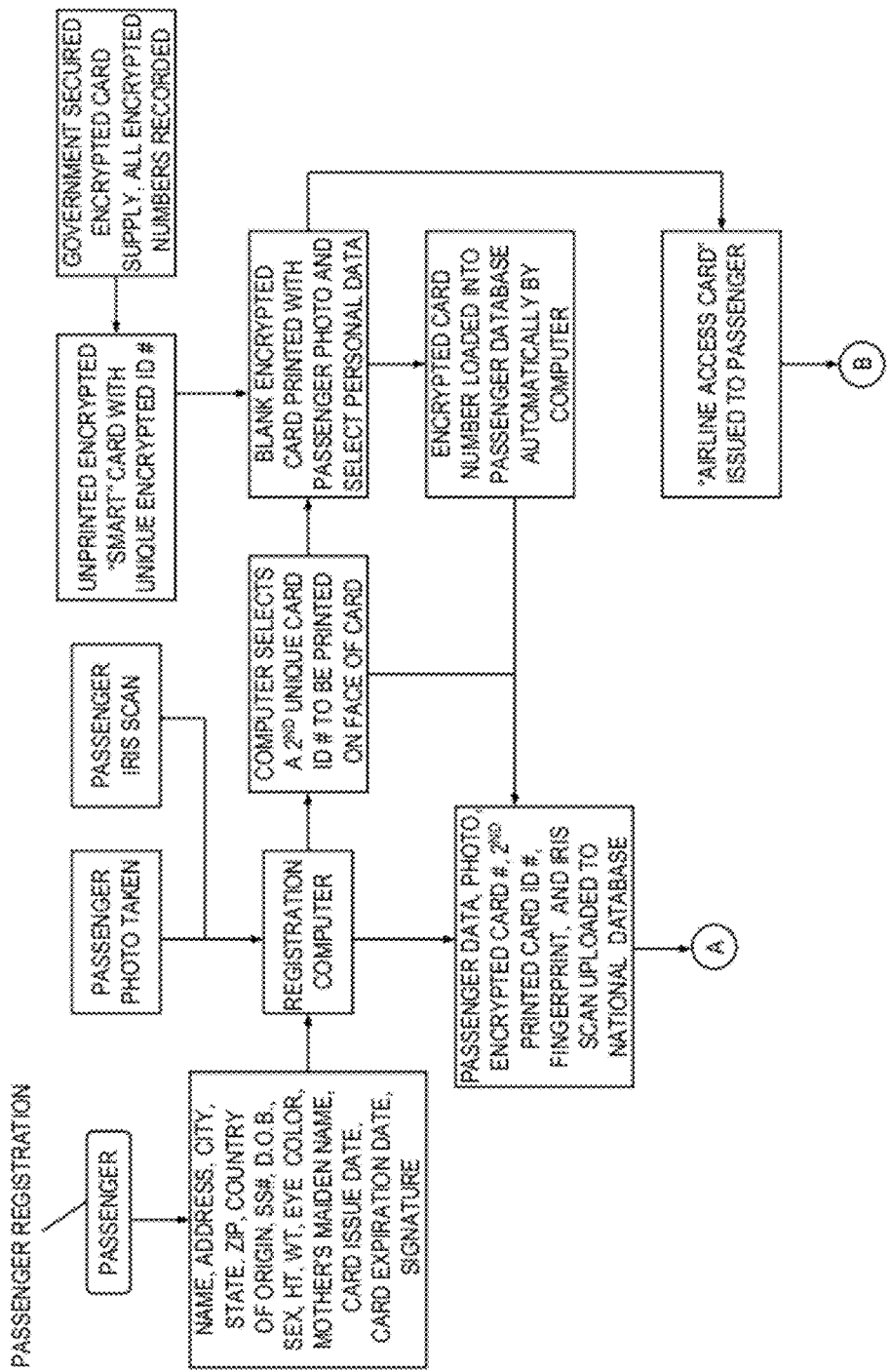
FIGS. 5A through 5E show an example application for the present invention.
Figure 5B:
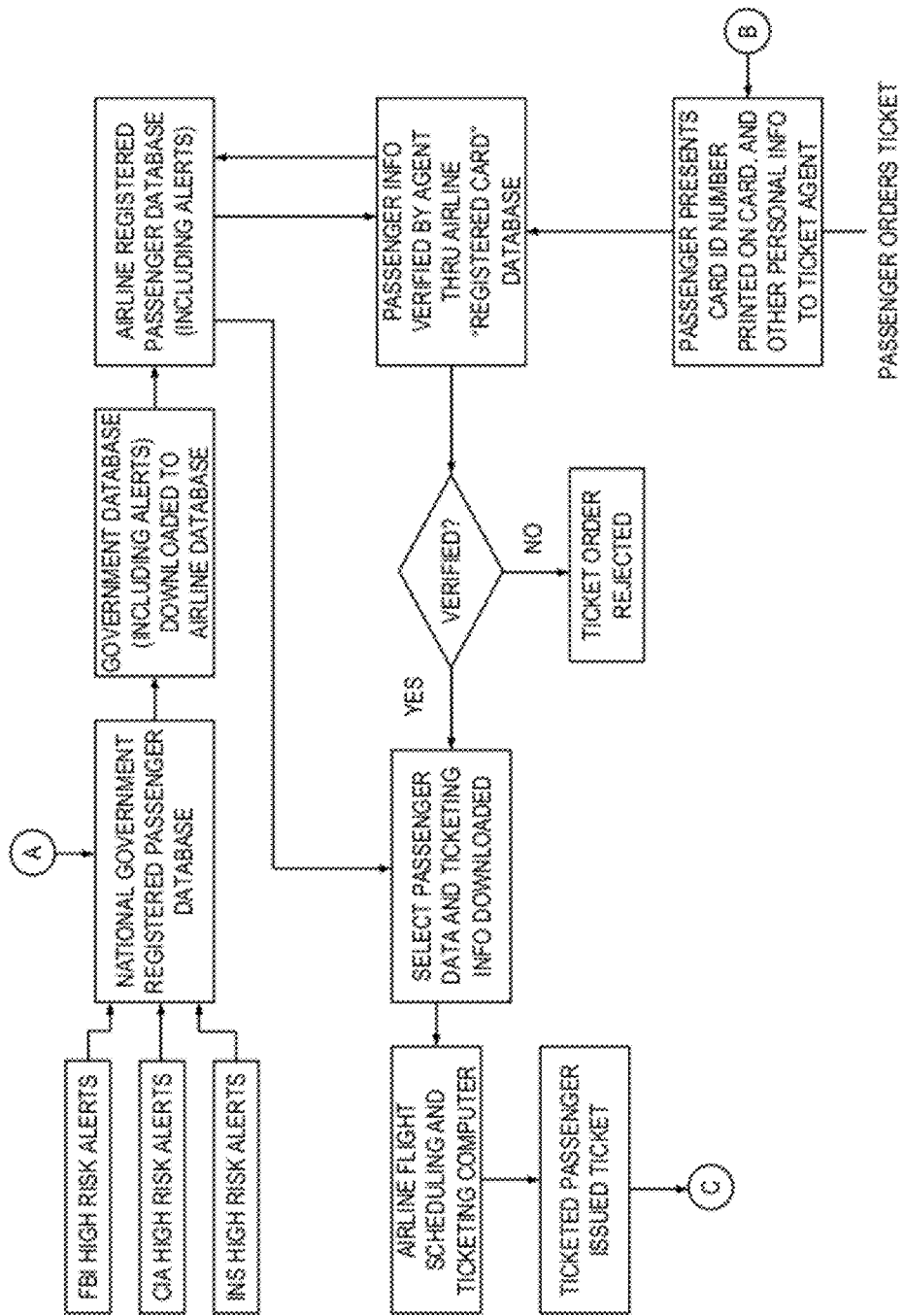
Figure 5C:
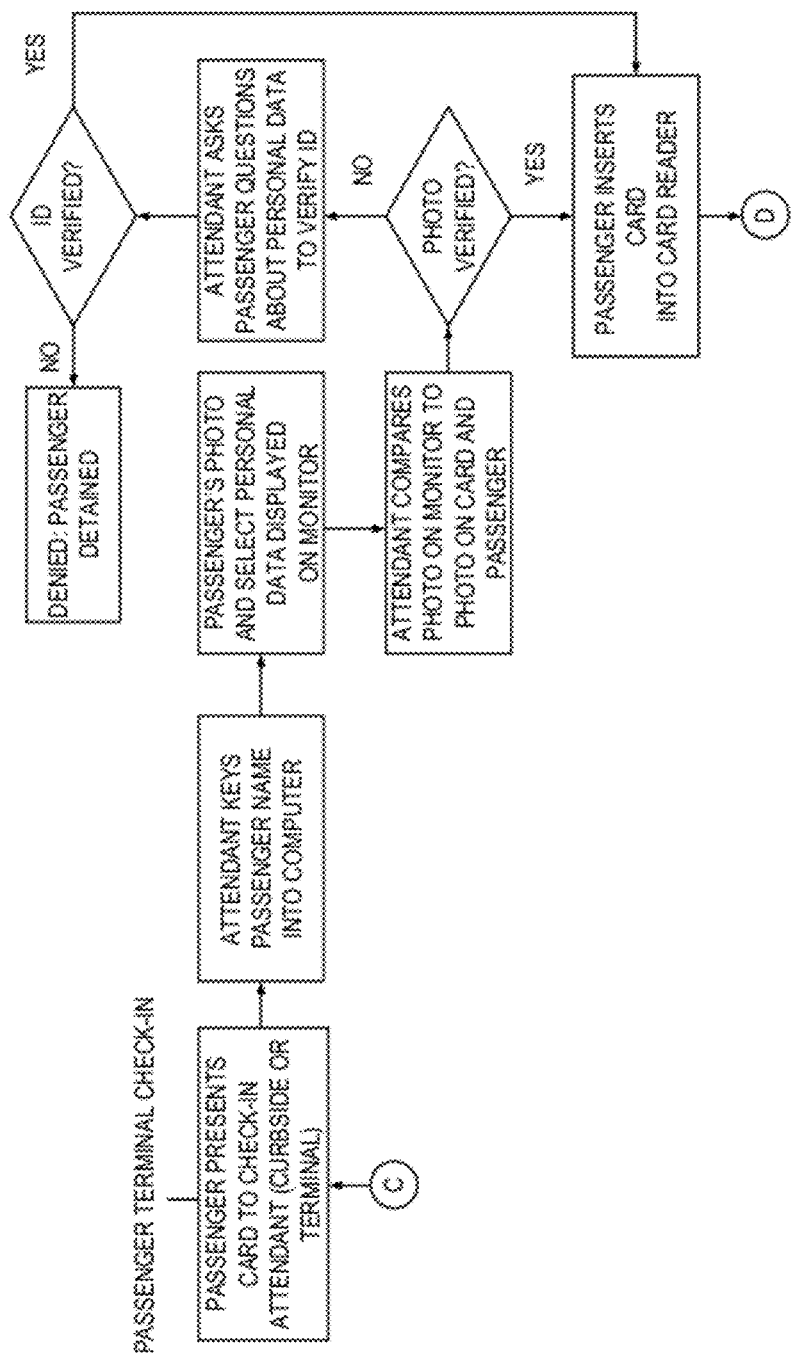
Figure 5D:
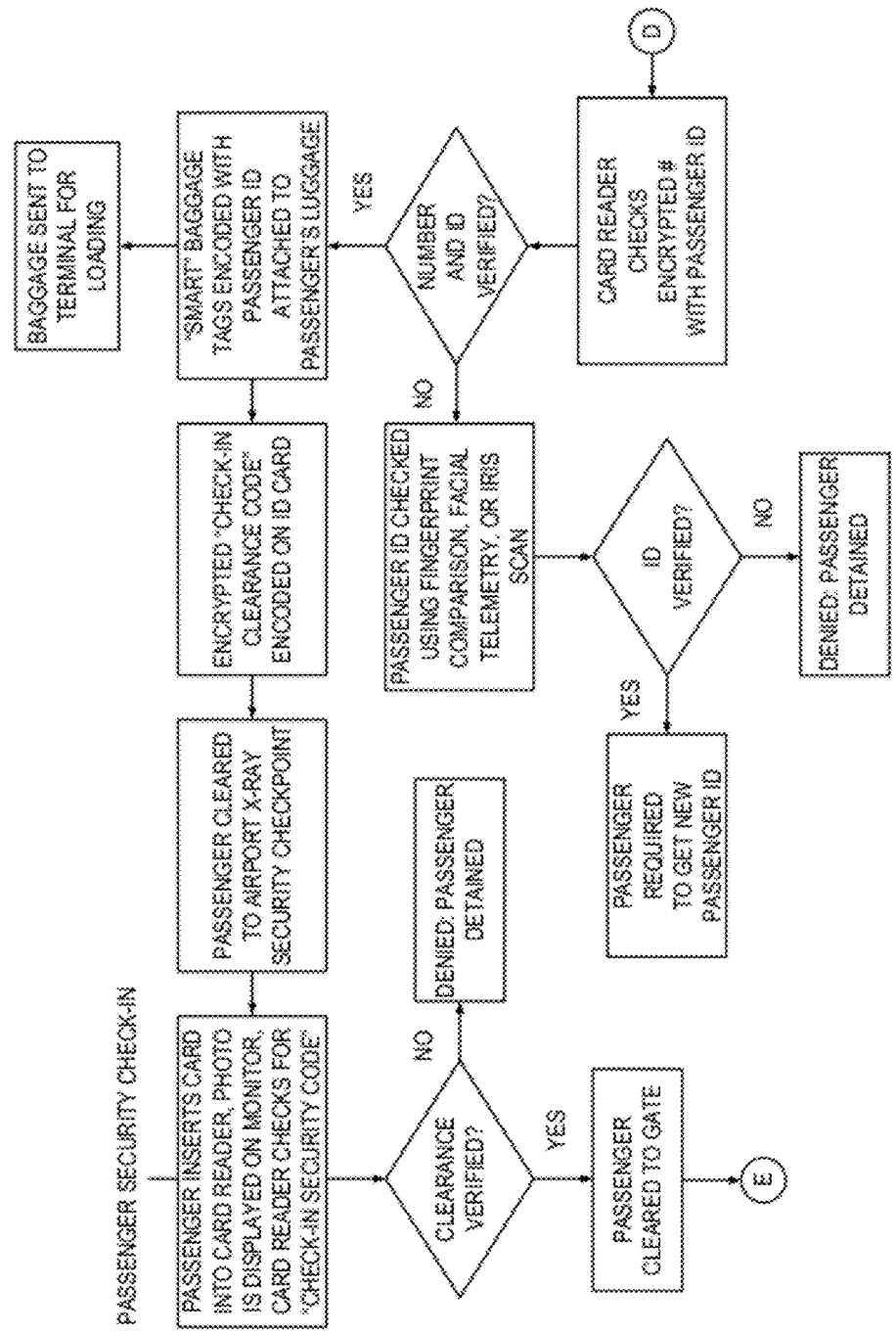
Figure 5E:
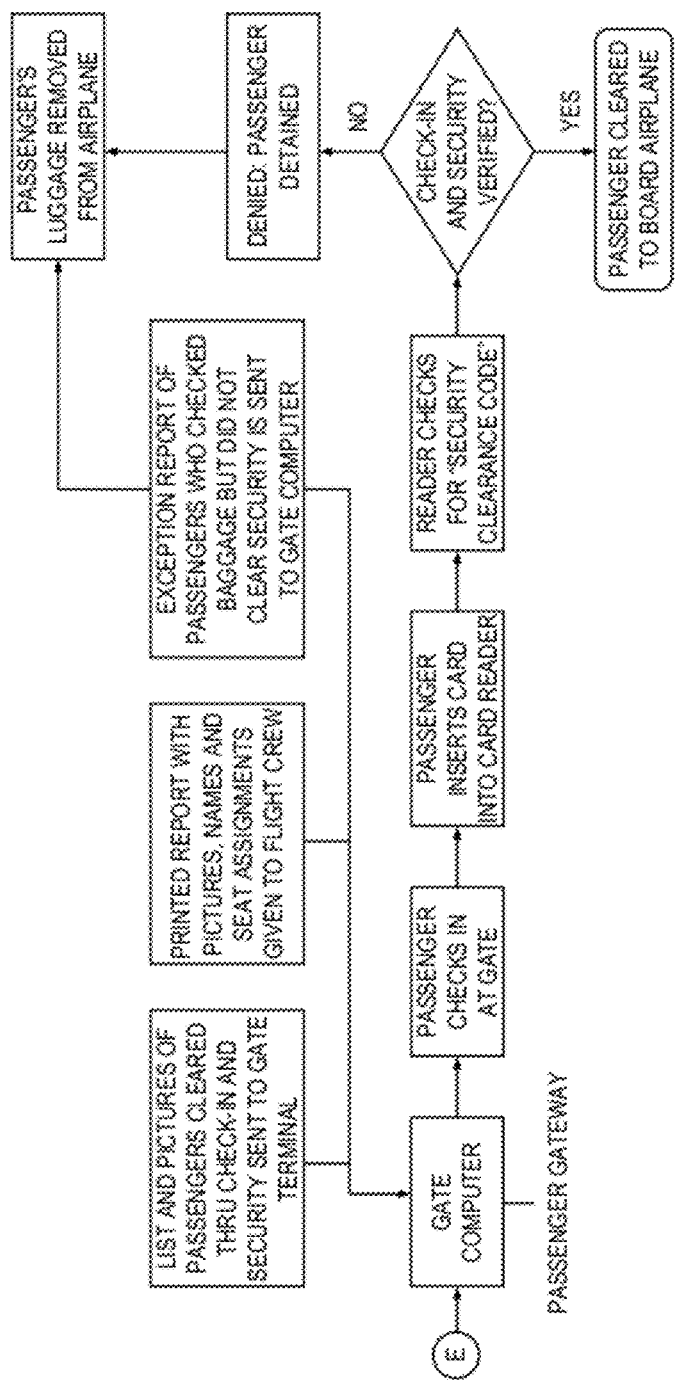
Figure 6:
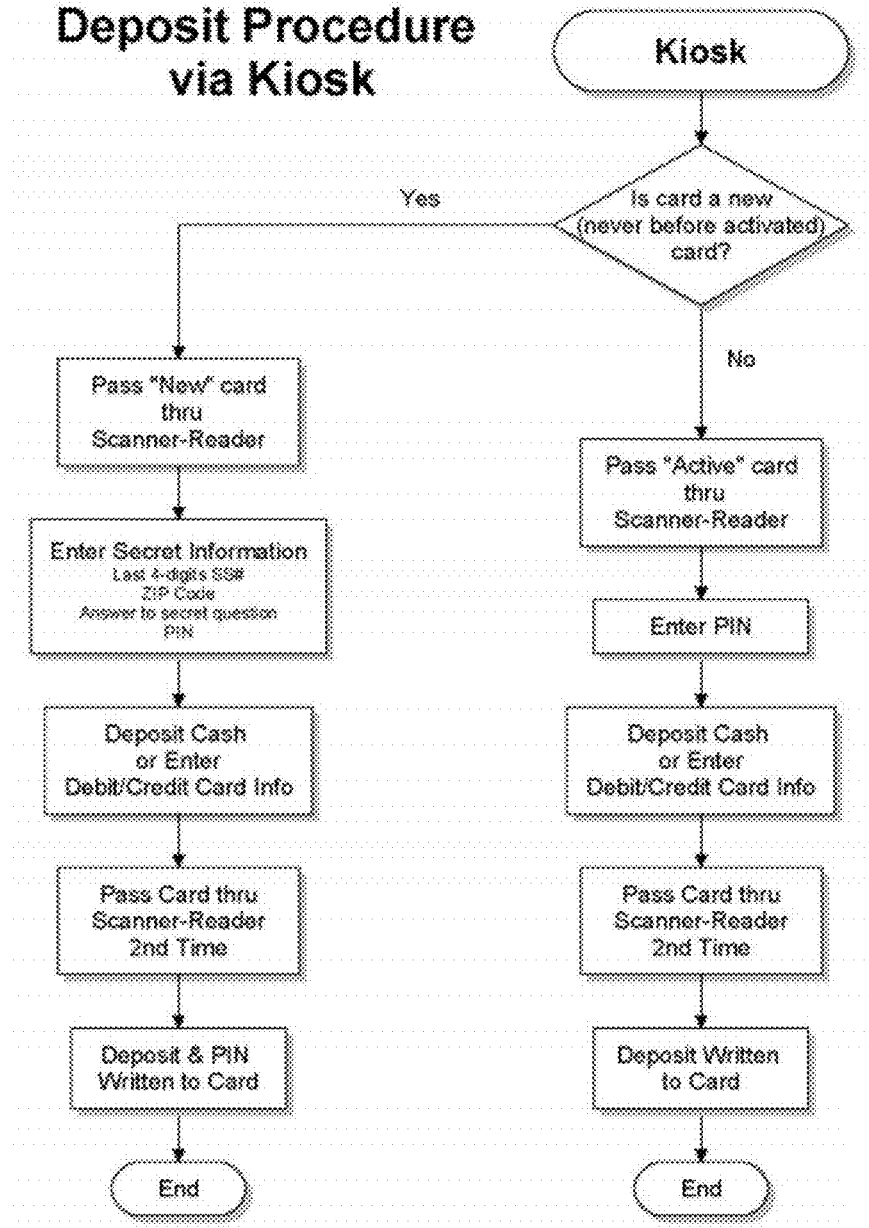
Figure 7:
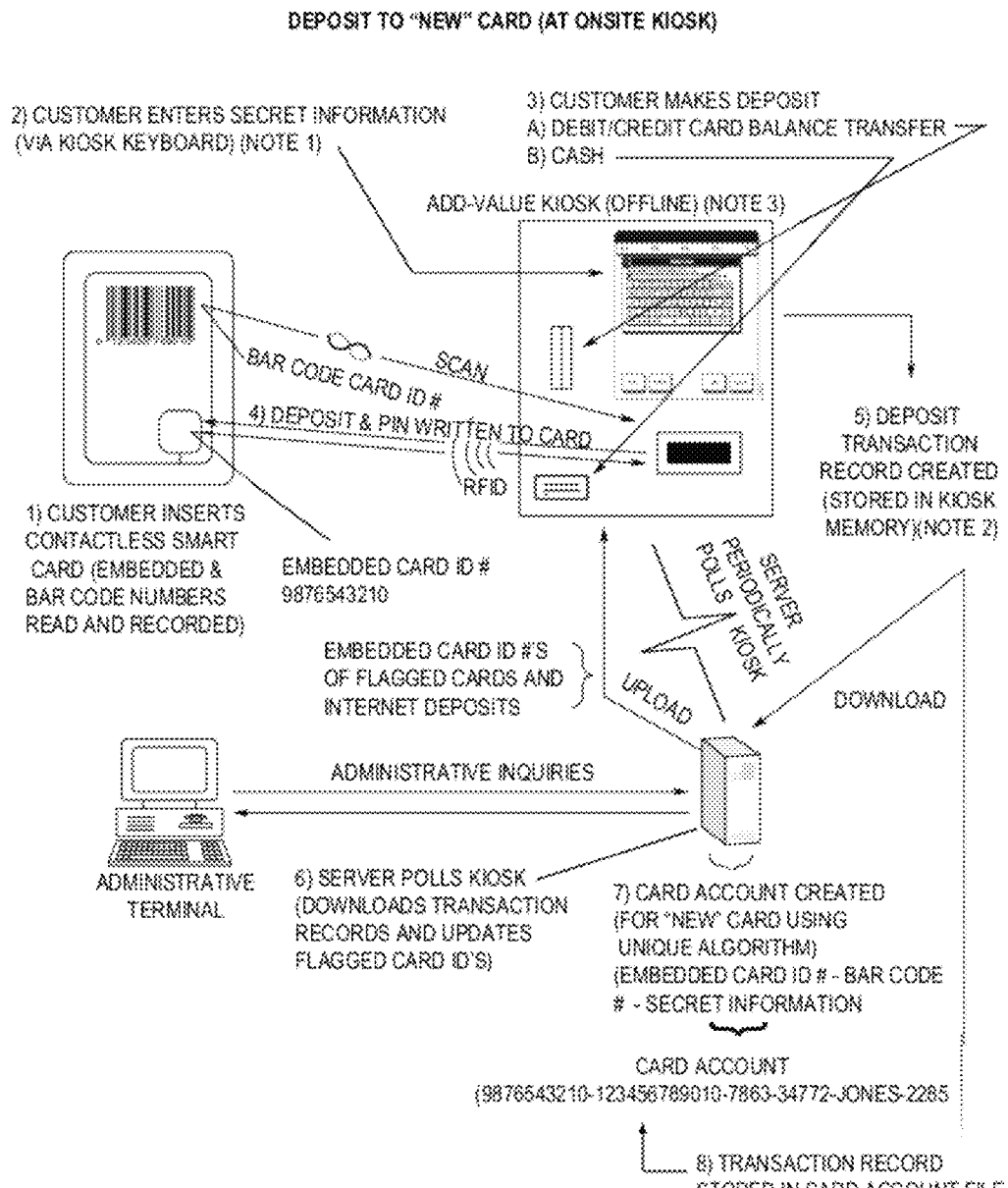
Figure 8:
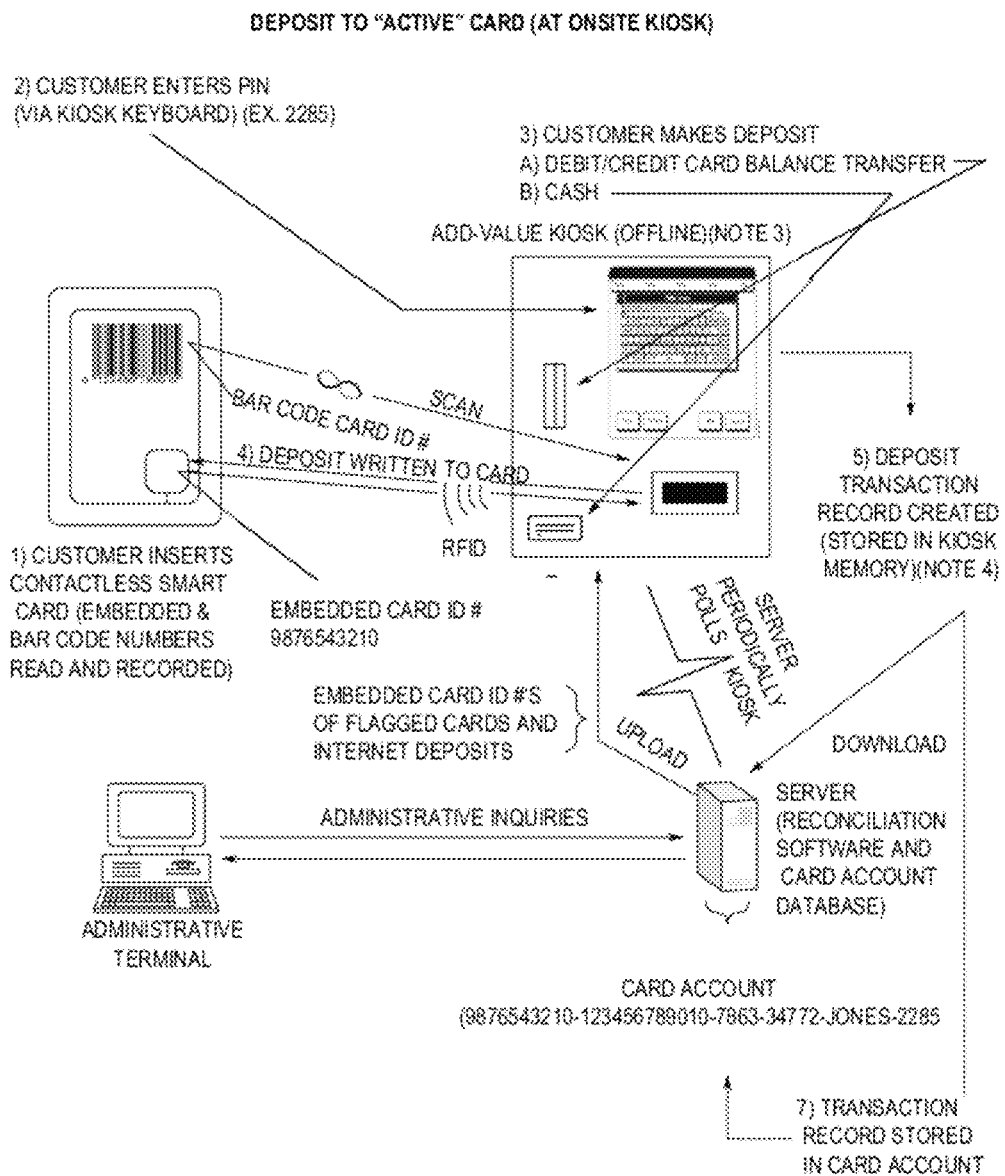
Figure 9:
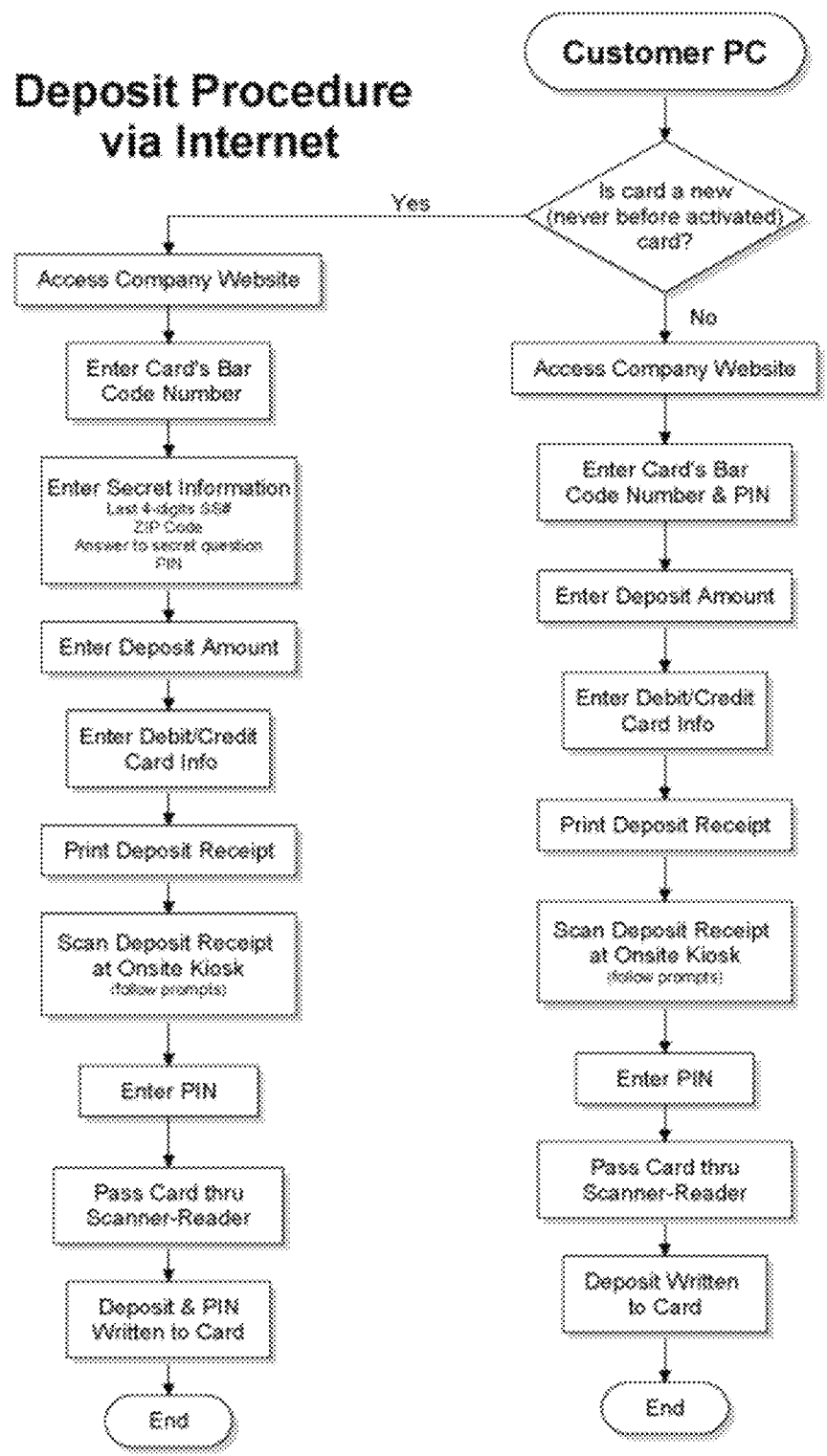
Figure 10:
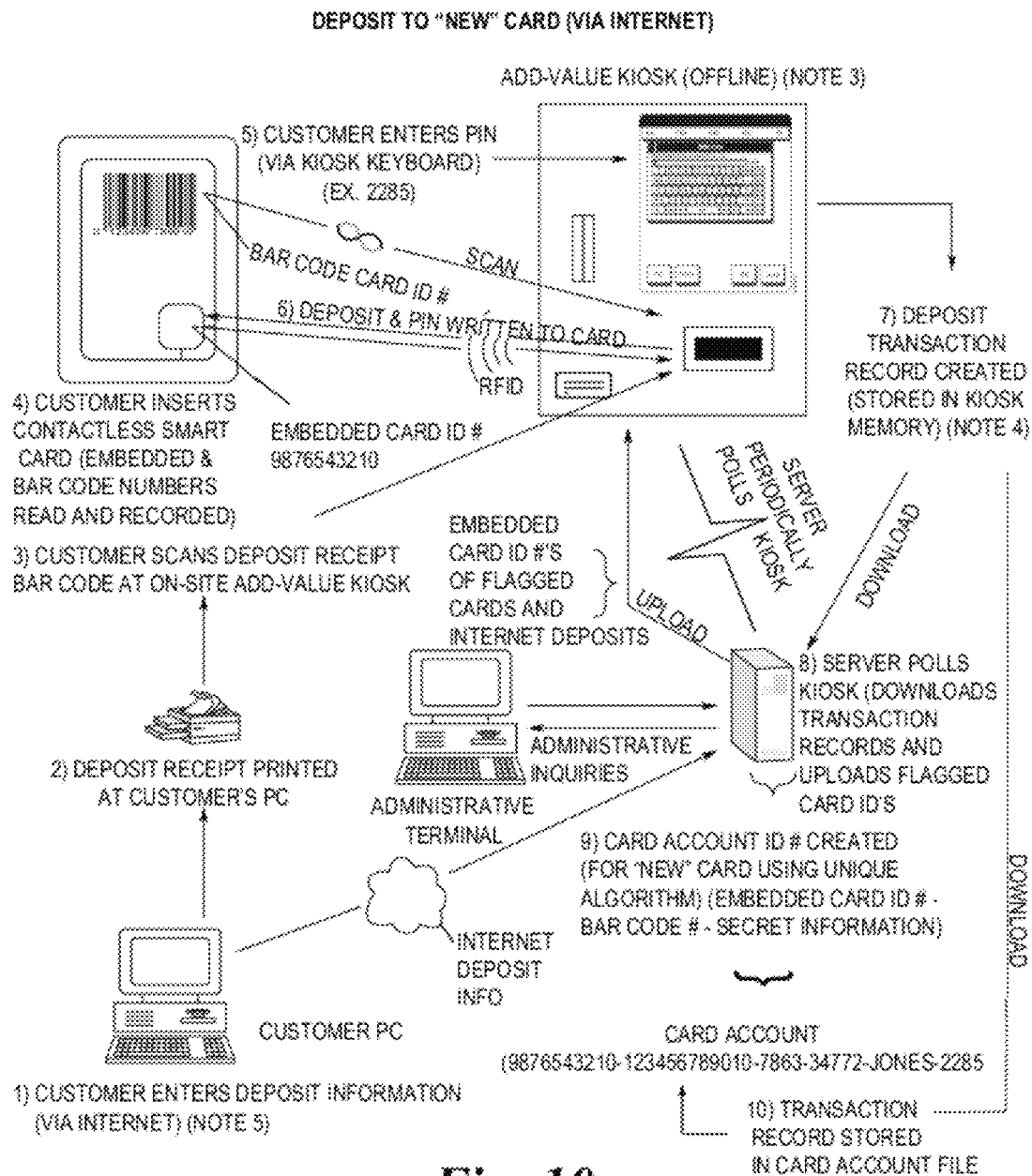
Figure 11:
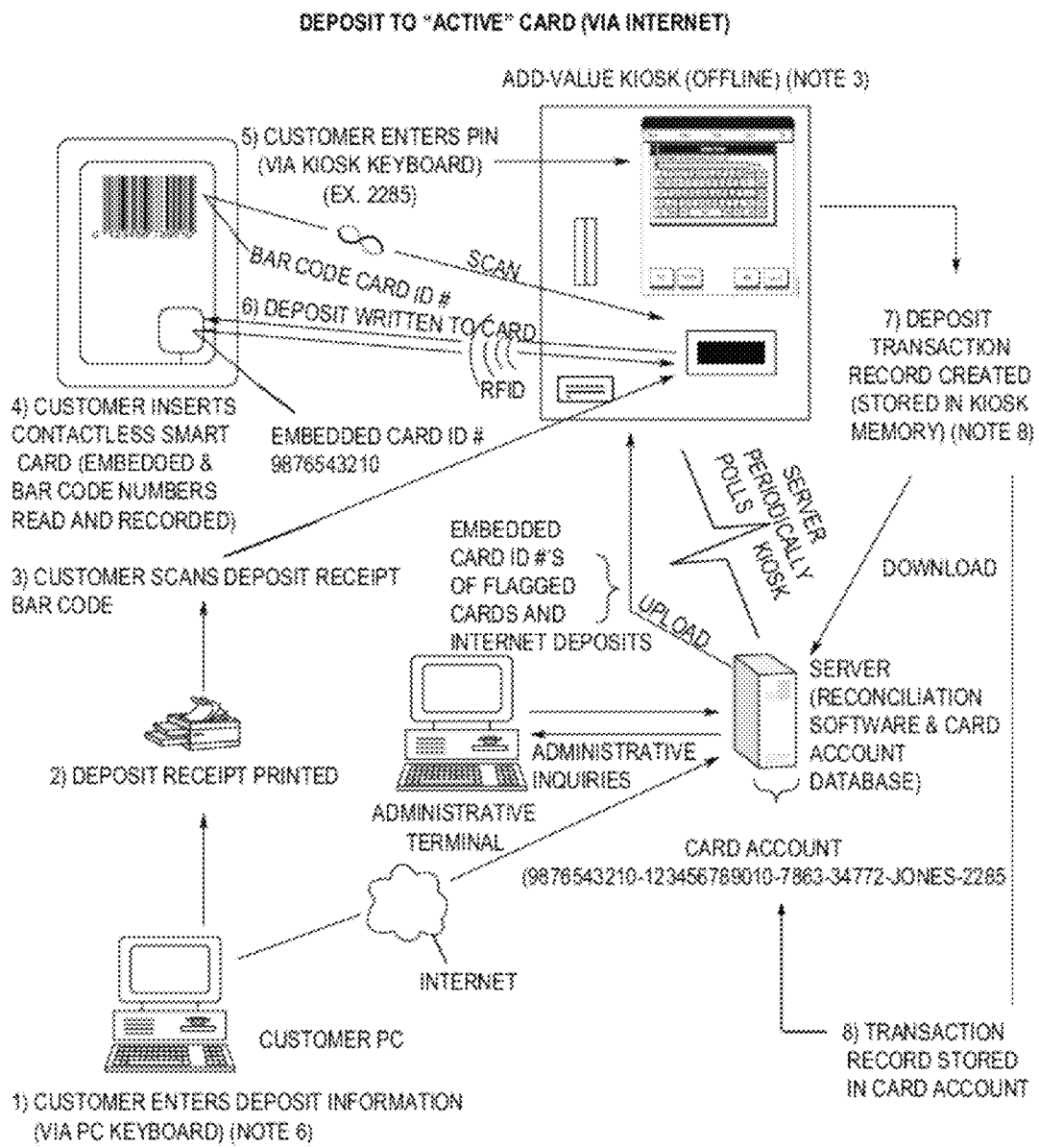
Figure 12:
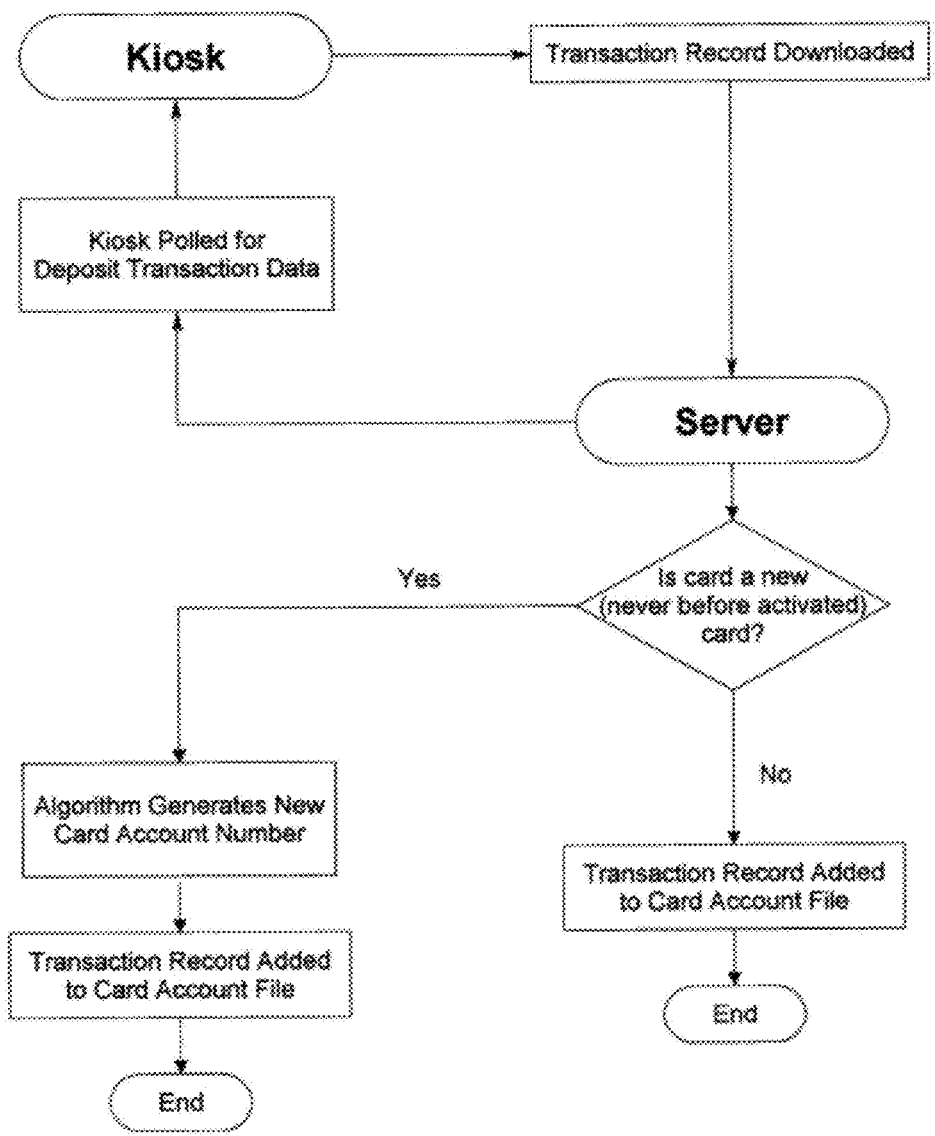
Figure 13:
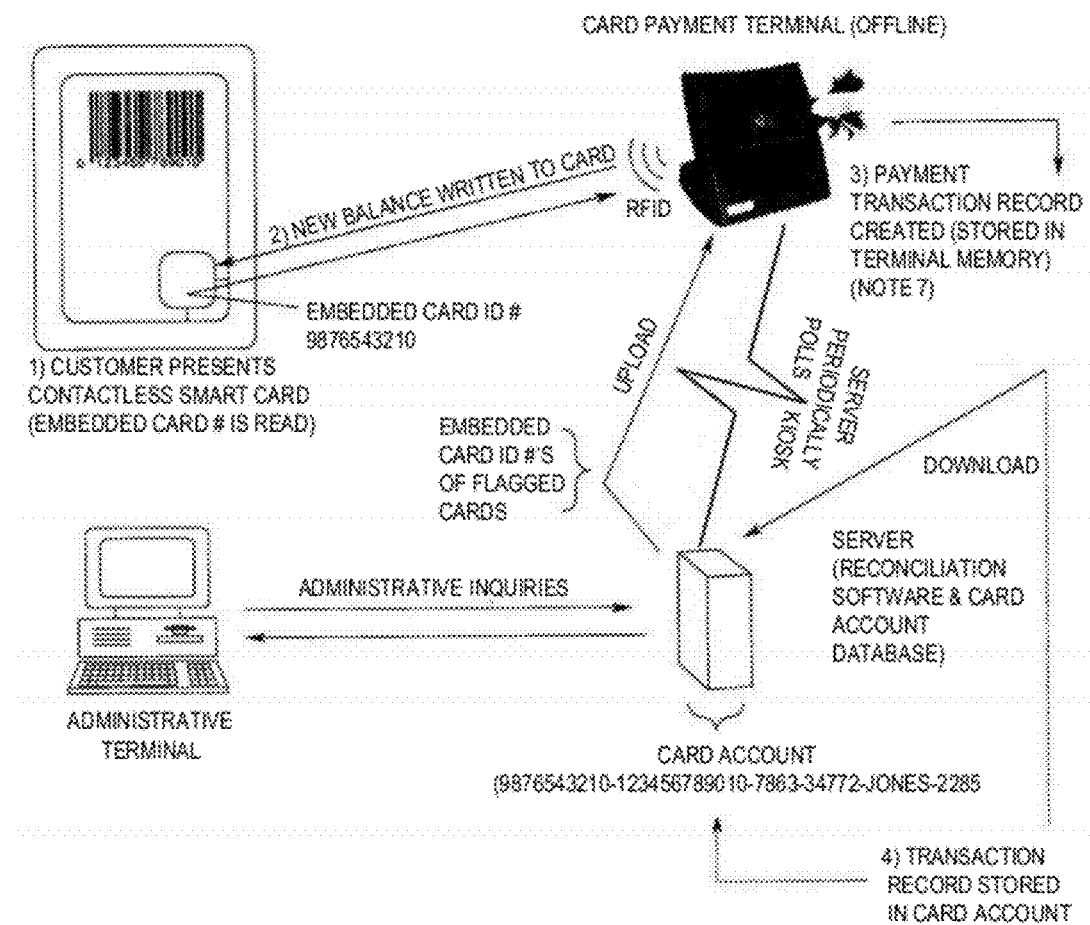
Figure 14:
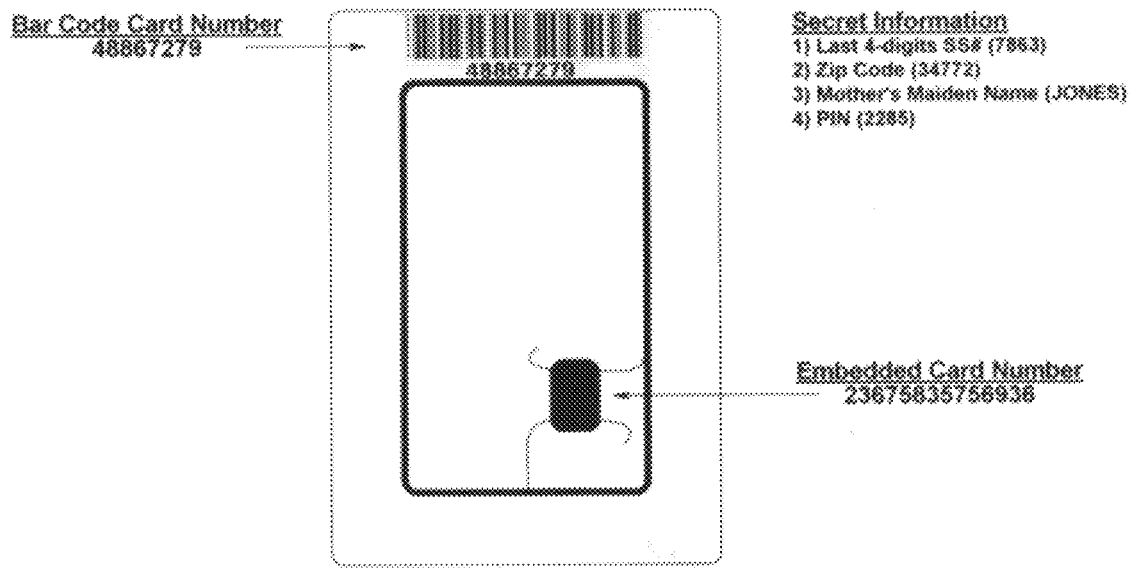

At step s34 the patron provides, using the web site, debit card account information or credit card account information and the amount of funds to be deposited on card 102. The secret information and funds information is forwarded to control 120 for storage in database 124 (FIG. 3). The patron is provided with a printable receipt, which may include bar coded information relating to the transaction.

Upon entering the business the patron presents the receipt to the business at step s36, either at a deposit terminal 118 at a kiosk or at a customer service center 128 (FIG. 3). The bar code on the receipt is electronically scanned to retrieve the deposit information and, using the predetermined algorithm, a unique deposit account number associated therewith is generated and recorded in a memory portion of the deposit terminal. Control 120 may periodically poll deposit terminal 118, via network 122, for deposit account information such as generated account numbers and associated fund deposit amounts. Upon receipt of deposit account information control 120 may store the information in database 124.

At step s38 a select card 102 is programmed with the appropriate encryption key 110, site code 112 (optionally) and bar code 114 associated with the generated deposit account. Card 102 may then be issued to the patron by an employee of the business, or may be vended automatically by a deposit terminal 118.

If a patron has a card 102 but has not yet used it, the patron generally follows steps s32-s36, described above. Then, at step s40 the patron presents the card 102 to the business. The card is programmed with the appropriate encryption key 110, site code 112 (optionally) and bar code 114 associated with the generated deposit account. Card 102 may be issued to the patron by an employee of the business, or may be vended automatically by a deposit terminal 118.

Once card 102 is encoded, it may be used at step s42 to purchase goods and services at any of one or more point of sale terminals 126 located at the business. The patron may utilize card 102 in the same manner as currency. For example, if the patron transfers $20 to card 102 and subsequently completes a transaction in the amount of $5.25 at a point of sale terminal 126, the amount of the transaction is debited from the $20.00 beginning balance on the card and a $14.75 ending balance is written into data storage 113 of memory 106 of the card. This is an electronic equivalent of the patron receiving $14.75 change in currency when presenting $20.00 in currency. As can be seen, the available funds are always physically in the possession of the patron.

Purchase information is periodically transferred from point of sale terminal 126 to control 120 when the point of sale terminal is polled by the control. To accomplish this, control 120 may periodically poll point of sale terminal 126, via network 122, for sales information associated with card 102. Upon receipt of sales information control 120 may store the information in database 124. Control 120 may further debit the deposit account in the amount of the sales information.

As can be seen from the foregoing, the present invention utilizes point of sale terminals 126 that function offline, i.e., as standalone devices independent of network 122. Instead, transaction data is stored in memory portion 106 of card 102. During a transaction, the point of sale terminal 126 reads the current balance on the patron's card 102, deducts the transaction amount from the balance, and writes the new balance into the card's memory 106, 113. In some embodiments the total transaction time may be on the order of about 1.2 seconds. If the beginning card balance is insufficient, point of sale terminal 126 will deny the transaction. Since network 122 is not required for operation of point of sale terminal 126, each point of sale terminal is a standalone device that is independent of all other devices and thus is not affected by network failures, slowdowns or outages. Furthermore, deposit terminals 118 and point of sale terminals 126 may be removed, relocated, and/or added at any time. Deposit terminals 118 and point of sale terminals 126 are periodically polled by control 120 by means of network 122, transferring transaction data (i.e., date, time, transaction amount, card ID number 108, terminal identification information, terminal physical location information, and ending card balance) is downloaded to database 124.

The offline nature of the present invention also shields it from intrusion from unauthorized personnel. As can be seen from the foregoing discussion, no personal identity information is required to accomplish either sales transactions or the storage of data in database 124, reducing the risk of patron identity theft. Furthermore, only limited personal or secret information is required to deposit funds onto card 102. In short, the personal identity and/or any personal information about the cardholder are not maintained within the present invention. The patron may optionally add a layer of security by requiring a PIN for each transaction. In addition, the patron's funds are physically present on card 102 at all times. Thus, all unspent funds remain in the physical possession of the patron, just like cash, unless card 102 is lost or stolen. Unlike cash, however, if card 102 is lost or stolen it can be locked out (i.e., rendered unusable) by control 120 in conjunction with terminals 118, 126 and a new card issued with the old card's balance, using the information stored in deposit terminal 118, point of sale terminal 126 and database 124. The patron's personal identity and their money remain secure throughout the process.

If a patron has a card 102 that has been previously used, a deposit account for that card may be maintained in database 124. Accordingly, the patron may add funds to card 102 generally using step s18 of FIG. 2 when present at the business, or generally steps s34 and s40 of FIG. 4 when adding funds via the internet.

Deposit terminal 118 and/or point of sale terminal 126 may also be configured to "cash out" or refund to the patron unused funds deposited to card 102. However, some patrons may prefer to carry the balance on their card 102 for future visits to the business. The carrying cost to the business for doing so is minimal, since there are no carrying costs beyond the cost to implement the systems and methods disclosed herein.

Example Embodiments

The following examples are for illustrative purposes only and are not intended to limit the scope of the present invention in any way.

The present invention may be utilized by a wide variety of businesses. For example, the business may be an amusement/theme park that issues site-specific cards 102 to visitor patrons. In such an embodiment patrons may utilize cards 102 to pay for admission to the park as well as paying for the various goods and services offered by the park. Card 102 allows a visitor to bypass the typical lines for admission, and provides security to the visitor in the event that the card is lost or stolen.

Similarly, the present invention may be utilized as a device for scheduling admission to certain rides and events. In this embodiment a patron presents card 102 to an appropriate point of sale terminal 126, pays any applicable charges associated with the transaction, and receives information regarding a date/time reservation for the purchased ride or event.

In some embodiments of the present invention site code 112 (FIG. 1B) may be utilized in conjunction with the methods 100, 200. For example, if site code 112 is utilized, control 120 (FIG. 3) may use the code to track demographic information, such as identifying which of a plurality of business locations card 102 is being used by patrons, traffic counting, and so on. Site code 112 may also be used to restrict the use of card 102 to the specific business, and/or to certain other, additional locations associated with the business.

Card 102 may be modified in form and shape within the scope of the invention. As non-limiting examples microprocessor 104 and filament 116 of card 102 (FIGS. 1A and 1B) may be incorporated into a wrist band, ankle band, bracelet, necklace, apparel, accessories such as hats, and key fobs. Card 102 may also be secured to the patron in any conventional manner, such as with a lanyard, pins, snaps, fasteners, grips, ties and the like.

In some embodiments deposit terminal 118 (FIG. 3) may be used to limit expenditures of funds deposited to card 102. This may be useful, for example, for situations wherein a parent has obtained a card for use by a child and wishes to limit the amount of any single transaction and/or the accumulative amount of expenditures in a given time frame.

The present invention may also be utilized as a child locator device, for example, at an amusement park. In this embodiment a child is fitted with a card 102 in any convenient form including, without limitation, a wrist band. In the event that the child becomes separated from his or her guardians the child may be escorted to a point of sale terminal 126 by an employee of the park. The employee scans card 102. The location of the child is provided to control 120 by means of network 122. Subsequently, the child's guardians may make inquiry as to the location of the child, likewise using a point of sale terminal 126. The guardians may receive in response to their inquiry the location of the child on a map display, the location being determined based upon the known physical location of the particular point of sale terminal 126 where the child's card 102 was scanned.

A business employing the present invention may offer price discounts and other incentives to participating patrons. Since the processes of depositing funds to card 102 and making purchases with the card may be accomplished by the patron without aid from the business, overhead costs for the business (such as the number of customer service employees) may be reduced.

Card 102 may also be utilized as a medium for advertising. For example, an amusement park may place on the card advertising for a certain beverage available for purchase at the park. The manufacturer of the beverage will pay for such advertising with the expectation that the advertising will help to raise awareness of its product and, in turn, increase sales of the product at the park.

FIG. 5 illustrates the present invention embodied as a means of improving the flow of passenger traffic through an airport, while at the same time increasing the security of the airport.

Still another embodiment of the present invention is described below, with general reference to FIGS. 6-13 together.

In a stored-value debit card system the value of the card is written into the card's memory after each transaction (deposit or payment). This enables the system to be totally offline rather than linked to a network server database via a real-time online network. There are several advantages to an offline stored-value system. First, the value of the card resides on the card and is thus in the possession of the card holder at all times. Second, the transaction terminals (both deposit and payment) can be standalone terminals totally independent of each other. Third, by being offline, the pitfalls of typical online networked systems (i.e. system-wide network failure, vulnerability to hacking, and card holder identity theft risks) can be avoided. Fourth, offline systems can effectively perform the debit card function in locations where online networked systems are either impossible or impractical.

A drawback, however, is that it has been difficult to link a stored-value card to its rightful owner in offline systems without tying each card to its owner via a networked database of card holders, thus negating the offline advantages listed above. The inability to verify ownership makes it impossible to recover the funds for the rightful owner of a lost, stolen, or damaged card.

The following embodiment of the present invention is designed to link the identity of the card holder (in a stored-value offline card system using smart cards or contactless smart cards) to his/her individual card for purposes of verifying the card's ownership. This methodology enables one to identify and verify the rightful ownership of the card without having personal data on file which divulges the personal identity of the cardholder.

The present invention also enables the cardholder to add funds to his/her card or access the card balance over the internet. To add value to a stored-value card, the card must be presented to a card terminal which then must physically write the value into a secured memory location on the card. This is accomplished by requiring the card holder to deposit bills into a bill acceptor or carry out a credit/debit card balance transfer at a card add-value station or kiosk. Until now, the cardholder has had to wait until they were physically on-site at the add-value kiosk to carry-out the entire add-value process. This embodiment of the present invention allows the card holder to deposit funds via the internet and then later have the funds physically written to the card at an on-site add-value kiosk.

Further, the present invention provides the ability to recover, for the original card holder, the value of a card that has been lost, stolen, or damaged. Stored-value cards store the monetary value of the card in a secured memory location on the card. All transactions are completed offline at a transaction terminal. In the case of smart cards and contactless smart cards, the value is written to and stored in memory on the card's secured memory chip. Since this is the only formal record of the card value in an offline system, if the card is lost, stolen, or damaged, the value is lost and unrecoverable by the original card holder (much like losing cash). In addition, there has traditionally been no way to authenticate the identity of the authorized card holder in a true offline system since offline transactions do not reference a card database for card authentication and balance verification before the transaction is carried out. The present invention allows one to determine the identity of the original card holder as well as the value of a lost, stolen, or damaged card without the need to link the card and cardholder to a real-time online network database.

During the manufacture of smart cards and contact-less smart cards, the card manufacturer may embed a unique card ID number into the secured memory of each card. This card ID number can only be read by a compatible card reader and is not visible to the cardholder. The card holder, therefore, has no way of knowing what this number is and cannot reference it as their card number. In addition, the card memory is programmed with proprietary embedded encryption keys and site codes to ensure card authentication and authorized use of the card.

During the printing and personalization of the stored-value smart card and/or contactless smart card, a unique card number, in the form of a human readable number with corresponding bar code, is printed on the face of the card. This readable number serves as a visual card identifier for the cardholder. The corresponding bar code (representing the readable number) can be scanned by an electronic bar code scanner. Note: The human readable/bar coded number is different from the unique card ID number embedded in the memory of the card by the manufacturer. Each card will therefore possess two unique number identifiers, one internal (embedded/hidden) and one external (printed/visible).

Although card security is enhanced with encryption keys, the actual embedded card ID number is not encrypted and therefore cannot serve as the sole means by which to safeguard funds and identify (i.e., authenticate) the authorized card holder. In addition, due to the ease of duplication and relative insecurity of bar code numbers, the barcode alone is also not sufficient to secure funds on the card; nor will it suffice as the only tool needed to identify the cardholder.

A particular problem addressed with the present invention is the verification of the authorized cardholder. There is a need to maintain an offline system that (1) allows one to identify the original card holder; (2) avoids the potential for system-wide catastrophic network failure; (3) is safe from the threats of hackers and unauthorized intrusion; (4) protects the personal identity of the cardholder (by not requiring the cardholder to provide detailed information that would potentially lead to personal identity theft issues); (5) allows the cardholder to use the internet to procure a card and/or deposit funds to a card; and (6) guarantees the recovery of funds for the cardholder when their card is lost, stolen, or damaged.

The present invention creates a third, unique card number identifier "card account number" using an encryption algorithm consisting of: (1) the embedded card ID number; (2) the card's human-readable bar code number; and (3) secret information (e.g., the last four digits of the user's social security number, a ZIP code, the user's mother's maiden name, a select personal identification number (PIN), and so on) that must be provided by the cardholder before the card can be activated.

In this embodiment new cards are inactive until the cardholder executes the first deposit to the card. The card holder must complete the add-value process (the deposit value must be physically written to the card) before they can use their card. The card holder enters their secret data and makes their deposit either over the internet (by credit/debit card, PayPal, etc.) or on-site at an add-value kiosk (by cash deposit, credit/debit card). The card holder then presents their still "inactive" card at the add-value station or kiosk (which is equipped with a smart card or contactless smart card reader and a bar code scanner) where the embedded card ID number and the bar coded number are simultaneously read and scanned. These two numbers become parts of the transaction record which is then stored in the add-value station/kiosk memory. The transaction record includes the embedded card ID number, the bar code number, the card holder's secret information (if it had not been previously provided over the internet), and the transaction data (e.g., date, time, card holder PIN, terminal ID, beginning card balance, transaction amount, ending card balance). The smart card reader then writes the deposited value into the card's memory. The card is activated only after the deposit value is physically written to the card.

The transaction record is stored in the add-value kiosk. The add-value kiosk is periodically polled by a server which downloads the transaction record. At the server, a "card account number" is created for newly activated cards using the encrypted algorithm by combining the embedded card ID number and bar code number with the secret information supplied by the cardholder. The transaction record becomes a single record in the card's individual "card account" transaction history. For a card that has been previously activated and for which a "card account number" has already been created, only the embedded card ID number, bar code number, and transaction data are downloaded to the server where the transaction record is added to the corresponding "card account."

During a payment transaction, the point-of-sale (POS) payment transaction terminal reads the card balance as well as the embedded card ID number, the customer PIN (if applicable), and the encryption keys and site codes to authenticate the card. If the card is not authenticated, the card is rejected. If the card balance is insufficient to pay for the purchase, the transaction is denied by the terminal. If the balance is sufficient, the payment terminal debits the transaction amount from the beginning card balance and writes the ending card balance into the card's memory. After a successfully transacted payment, the terminal records the embedded card ID number and the transaction data (e.g., date, time, card holder PIN, terminal ID, beginning card balance, transaction amount, ending card balance) and stores it as a transaction record in the terminal memory. Multiple transactions can be stored in the terminal's memory. Periodically, the server polls each transaction terminal in the system and downloads all transaction data. Each transaction record becomes a single record in the card's individual "card account" transaction history.

Once the "card account number" is created and stored in the server database, the "card account" can be accessed. For example, a cardholder can view their account transaction history and "card account balance" over the internet. The card holder accesses the card issuer's web site and enters the human readable number from their card and their secret information. Once the card holder is verified, the card information can be displayed.

When a card is lost, stolen, or damaged, a cardholder can recover the funds that were on the card by reporting the fact to a card administrator. The cardholder presents the card administrator with the secret information that they originally provided when the card was initially activated. This information is a part of the encrypted "card account number" stored in the server. Through a series of steps carried out at an administrative PC terminal connected to the server, a card administrator can determine the identity of the card holder's "card account number" from which the card's embedded card ID number can be deciphered. Once the individual is verified as the original cardholder, they can be issued a new card or their money refunded. In the meantime, the embedded card ID number of the card that was lost, stolen, or damaged is "flagged" and uploaded to a current hot list of unauthorized cards stored in each device in the system. The card is denied further access to the system and thus rendered useless.

The present invention is relevant in any stored-value card system using cards that carry an embedded card number that can be read by a compatible card reader device.

In this embodiment of the present invention, card holder identity is achieved without the need for intrusive personal information from the card holder. The identity of the card holder cannot be determined in any part of the process without direct cooperation from the card holder. Some applications, however, may wish to take additional security measures to identify the rightful card holder. In such applications, biometrics can be used to identify the card's original owner. An individual's fingerprint can be scanned and the fingerprint record stored in the card memory. This affords the card holder (the biometric owner) the opportunity to manage the physical possession of the card holding their biometric information. The individual's biometric can be captured by a reader and passed to the smart card for matching, rather than passing the stored biometric information to the reader for matching. The individual's biometric information would never leave the card, preventing virtually any possibility of compromise.

As can be appreciated by one skilled in the art, the term "number" as used herein may include any suitable combination of indicia such as numeric and alphabetic characters, as well as the previously-discussed card code. Examples of these are shown in FIGS. 7-14. A "number" may also comprise non-symbolic information, such as the biometric information discussed above.

From the above description of the invention, those skilled in the art will perceive improvements, changes, and modifications in the invention. Such improvements, changes, and modifications within the skill of the art are intended to be covered.

What is claimed is:

1. A system for carrying out secure transactions, comprising:
   a transaction card including:
      a card memory portion;
      transaction card criteria comprising a fixed, unique, non-visually perceivable, machine-read card identification number, the card identification number being stored in the memory portion, and
      a visually perceivable, machine-readable card code, the visually perceivable card code differing from the non-visually perceivable card identification number and being placed on a surface of the transaction card;
   a deposit terminal to receive the transaction card, obtain the transaction card criteria from the transaction card, analyze the transaction card criteria and, when the transaction card has not been previously utilized, associate the transaction card with a specific user and create a transaction record corresponding to the transaction card and the user, the transaction record being stored within the deposit terminal, the deposit terminal further being configured to encode the card memory portion with deposit data relating to a predetermined monetary value and to further store the deposit data in the transaction record;
   a payment terminal for conducting offline commercial transactions based solely upon the transaction card criteria and the monetary value stored upon the transaction card, the payment terminal receiving the transaction card, obtaining the transaction card criteria and stored monetary value from the transaction card and updating the monetary value stored in the card memory portion to reflect commercial transactions, the payment terminal further storing information relating to the transaction card and the commercial transactions conducted using the transaction card; and
   a database, the database receiving the non-visually perceivable card identification number and the visually perceivable card code, the database further receiving secret information from a rightful user of the transaction card, the database utilizing the non-visually perceivable card identification number, the visually perceivable card code and the secret information as inputs to an algorithm, the algorithm generating a unique card account number, the unique card account number being associated with an individual card account, the individual card account storing transaction history information relating to the transaction card and the validity status of the transaction card, the validity status of the transaction card being periodically provided to the deposit and payment terminals.

2. The system of claim 1 wherein the transaction card is a contactless-type card configured to transmit and receive data by means of radio frequency communications.

3. The system of claim 1, further including:
a control connectable to a network, the deposit terminal and the payment terminal likewise being connectable to the network; and
the database being accessible by the control;
the control being configured to:
periodically poll the deposit terminal to obtain the deposit data, the deposit data being stored in the database,
periodically poll the point of sale terminal to obtain the information relating to the commercial transactions, the commercial transaction information being stored in the database, and
adjust the balance of the deposit transaction information stored in the database in the amount corresponding to the commercial transaction information.

4. The system of claim 3 wherein the network is a wireless network.

5. The system of claim 1 wherein the transaction card criteria does not include personally-identifiable data.

6. The system of claim 1 wherein the transaction card criteria further includes secret information supplied by the specific user.

7. The system of claim 1 wherein the transaction card criteria further includes an encryption key associating the transaction card to the system.

8. The system of claim 1 wherein the transaction card criteria further includes a predetermined site code.

9. A method for carrying out secure transactions, comprising the steps of:
providing a transaction card having a card memory portion and further including transaction card criteria comprising a fixed, unique, non-visually perceivable, machine-read card identification number, the card identification number being stored in the memory portion, and a visually perceivable, machine-readable card code, the visually perceivable card code differing from the non-visually perceivable card identification number and being placed on a surface of the transaction card;
providing a deposit terminal to receive the transaction card, obtain the transaction card criteria from the transaction card, analyze the transaction card criteria and, when the transaction card has not been previously utilized, associate the transaction card with a specific user and create a transaction record corresponding to the transaction card and the user, the transaction record being stored within the deposit terminal, the deposit terminal further being configured to encode the card memory portion with deposit data relating to a predetermined monetary value and to further store the deposit data in the transaction record;
providing a payment terminal for conducting offline commercial transactions based solely upon the transaction card criteria and the monetary value stored upon the transaction card, the payment terminal receiving the transaction card, obtaining the transaction card criteria and stored monetary value from the transaction card and updating the monetary value stored in the card memory portion to reflect commercial transactions, the payment terminal further storing information relating to the transaction card and the commercial transactions conducted using the transaction card; and
providing a database, the database receiving the non-visually perceivable card identification number and the visually perceivable card code, the database further receiving secret information from a rightful user of the transaction card,
the database utilizing the non-visually perceivable card identification number, the visually perceivable card code and the secret information as inputs to an algorithm, the algorithm generating a unique card account number,
the unique card account number being associated with an individual card account, the individual card account storing transaction history information relating to the transaction card and the validity status of the transaction card,
the validity status of the transaction card being periodically provided to the deposit and payment terminals.

10. The method of claim 9, further including the step of transferring funds to the transaction card by means of an internet web site.

11. The method of claim 10, further including the step of transferring funds to the transaction record by means of a kiosk.

12. The method of claim 10, further including the step of transferring funds to the transaction record by means of a customer service center.

13. The method of claim 9, further including the step of recording, in the transaction record, a predetermined indication, thereby rendering the transaction card unusable.

14. The method of claim 9, further including the step of storing, at a remote site, information relating to the transaction card, deposit account, deposit information and commercial transaction.

15. A payment terminal for securely conducting offline commercial transactions comprising:
a card reader configured to sense a plurality of transaction card criteria associated with a transaction card having a memory portion, at least one transaction card criterion being visually perceivable and at least one transaction card criterion being non-visually perceivable, the card reader further being configured to retrieve and modify available funds data stored upon the transaction card,
the at least one non-visually perceivable card criterion comprising a fixed, unique, machine-read first card identification number, the first card identification number being stored in the memory portion,
the at least one visually perceivable card criterion comprising a fixed, unique, second card identification number, the second card identification number differing from the first card identification number and being placed on a surface of the transaction card in two forms, one of which is human readable and one of which is machine-read but not stored in the memory portion,
the payment terminal being configured to retrieve available funds data from a select transaction card, debit an amount of a commercial transaction from the available funds data of the select transaction card, and modify the available funds data stored upon the transaction card to reflect the commercial transaction, and
the payment terminal conducting the commercial transaction based solely upon the transaction card criteria and the available funds data.

16. The payment terminal of claim 15 wherein the payment terminal further stores information relating to the transaction card and the commercial transactions in a terminal memory portion.

17. The payment terminal of claim 15, further comprising a processor, the processor receiving the sensed transaction card criteria and incorporating them into a predetermined algorithm to generate a unique card account number for use in generating a secure transaction.

18. The payment terminal of claim 17 wherein:
   the processor is remotely located from the payment terminal; and
   the processor periodically polls the payment terminal to obtain transaction data.

19. A deposit terminal for securely conducting offline commercial transactions comprising:
   a card reader configured to sense a plurality of transaction card criteria associated with a transaction card having a memory portion, at least one transaction card criterion being visually perceivable and at least one transaction card criterion being non-visually perceivable, the card reader further being configured to retrieve and modify available funds data stored upon the transaction card,
   the at least one non-visually perceivable card criterion comprising a fixed, unique, machine-read first card identification number, the first card identification number being stored in the memory portion,
   the at least one visually perceivable card criterion comprising a fixed, unique, second card identification number, the second card identification number differing from the first card identification number and being placed on a surface of the transaction card in two forms, one of which is human readable and one of which is machine-read but not stored in the memory portion,
   the deposit terminal being configured to encode the transaction card with deposit data relating to a predetermined monetary value and to generate and store within the deposit terminal deposit transaction information relating to the transaction card and the monetary value.

* * * * *